United States Patent [19]

Baer et al.

[11] Patent Number: 5,414,836
[45] Date of Patent: May 9, 1995

[54] SOFTWARE TESTING SYSTEM THAT EMPLOYS A GRAPHICAL INTERFACE TO GENERATE TEST CASES CONFIGURED AS HYBRID TREE STRUCTURES

[75] Inventors: William J. Baer, Los Gatos; Paul C. Leung, San Jose, both of Calif.

[73] Assignee: International Business Machines Corporation, Armonk, N.Y.

[21] Appl. No.: 129,632

[22] Filed: Sep. 29, 1993

[51] Int. Cl.⁶ .............................................. G06F 11/00
[52] U.S. Cl. ..................................... 395/575; 371/19; 371/4; 371/3; 371/16.1; 364/267; 364/DIG. 1
[58] Field of Search .................... 395/575; 371/19, 16, 371/15, 4, 3; 364/943.9, 965, 967, 286, 267, 267.91

[56] References Cited

U.S. PATENT DOCUMENTS

| | | | |
|---|---|---|---|
| 4,819,233 | 4/1989 | Delucia et al. | 371/19 |
| 5,067,129 | 11/1991 | Evans et al. | 371/16.1 |
| 5,187,788 | 2/1993 | Marmelstein | 395/700 |

OTHER PUBLICATIONS

Tenenbaum and Avgenstein, Data Structures Using PASCAL, pp. 96–104 (1981).
Cherniavsky, Validation Through Execution: Techniques for Ensuring Software Safety, COMPASS '89, Proceedings of the Fourth Annual Conference on Computer Assurance, pp. 56–59 (Jun. 19–23, 1989).
Chadwick, Help for Organizing Automated Test Suites, IEEE Software, pp. 108–110 (Mar. 1992).
Murphy, On Stage: Info Mentor Software, Computer Language, p. 69 (Jul. 1992).
Thevenod-Fosse, From Random Testing of Hardware to Stastical Testing of Software, Proceedings of the Advanced Computer Technology, Reliable Systems and Applications, CompEuro '91, pp. 200–207 (May 13–16, 1991).
Software TestWorks, Computer Language, p. 92 (Apr. 1992).
OnStage, Data Sources Report, 1991.
"Art of Software Testing", Glenford Myers, John Wiley & Sons, (1979), pp. 56–59.

*Primary Examiner*—Robert W. Beausoliel, Jr.
*Assistant Examiner*—Alan M. Fisch
*Attorney, Agent, or Firm*—Perman & Green

[57] ABSTRACT

A data processing system enables a user to generate test cases that exercise a program under test. The data processing system includes a display, a keyboard input and memory for storing a library of node types including AND, OR, Decision and Content nodes, node linking data and a graphical user interface procedure. A central processor controls the display, input keyboard and memory and in response to user inputs, creates a data base in memory that defines a hybrid tree structure that includes a plurality of node data structures. Each AND node data structure is connected by links to a plurality of child node data structures, each link to a child node data structure defining a sequence order value among all child node data structures linked to the AND node data structure. Each sequence order value defines a position in a sequence in which information is placed in the test case by traversal of the associated child node data structure. OR node data structures include an ability to set probabilities of visitation during traversal of a tree structure and Content node data structures enable definitions of a numerical set range and a probability that a randomly chosen value will be inside or outside the range. All AND, OR and Content node data structures have a looping attribute which defines how many times the node and its children will be revisited during execution of the tree structure. A Decision Node directs further traversed of the tree dependent upon the achievement of a condition statement.

18 Claims, 11 Drawing Sheets

FIG. 2

AND NODE

SYMBOL: O (CIRCLE)
LABEL: UNIQUE NAME (STRING)
DEFINITION: PLACES INFORMATION INTO TEST CASE, THAT IS CONTAINED IN ALL CHILD NODES IN ORDER ASSIGNED TO LINKS THAT CONNECT TO CHILD NODES
CHILD NODE LINK ORDER: ASSIGNS SEQUENCE OF VISITATION TO EACH CHILD NODE (INTEGER)
FACETS: LOOP = NUMBER OF TIMES NODE REVISITED DURING EXECUTION

42

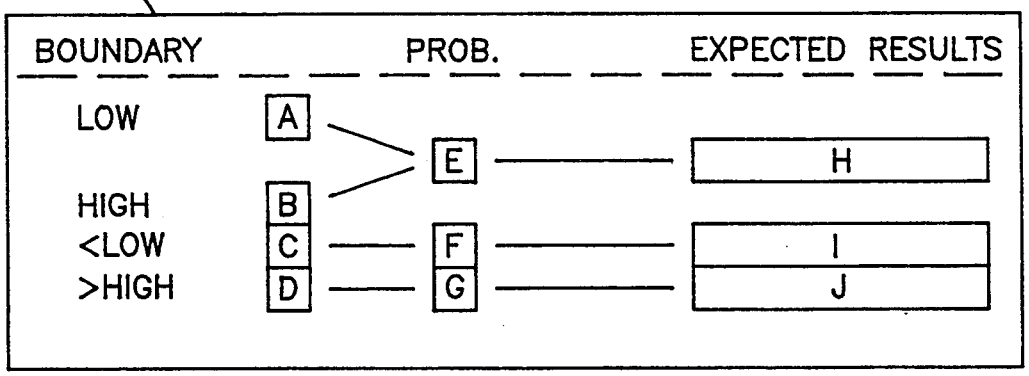

LOOP: DEFINES THREE LOOPS (A,B), C AND D. EACH LOOP (A,B), C AND D HAVE PROBABILITIES E, F AND G, RESPECTIVELY. ALSO, LOOPS (A,B), C AND D HAVE EXPECTED RESULTS H, I AND J, RESPECTIVELY.
A,B ARE INTEGERS (USERS ENTERED)
C,D ARE PLACE HOLDERS
E,F,G ARE INTEGERS BETWEEN 0 AND 100 (USER ENTERED)
H,I,J ARE STRINGS OF TEXT

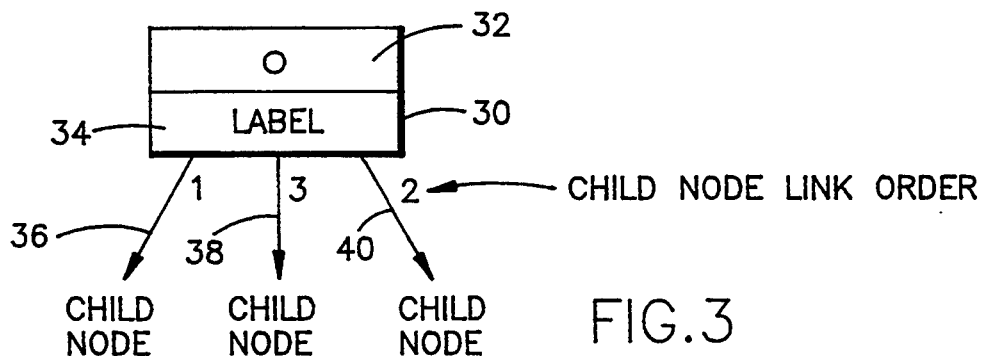

FIG. 3

OR NODE    FIG. 4

50

SYMBOL:    △    (TRIANGLE)
LABEL:     UNIQUE TIME (STRING)
DEFINITION:    PLACES INFORMATION INTO TEST CASE, THAT IS CONTAINED IN ONE CHILD NODE BASED UPON ASSIGNED PROBABILITY VALUE OF LINK TO CHILD NODE (I.E. HOW OFTEN CHILD NODE APPEARS IN TEST CASE IS CONTROLLED BY PROBABILITY VALUE)
CHILD NODE LINK PROBABILITY: ASSIGNS SEQUENCE OF VISITATION TO EACH CHILD NODE (INTEGER)
FACETS:    LOOP = NUMBER OF TIMES NODE REVISITED DURING EXECUTION

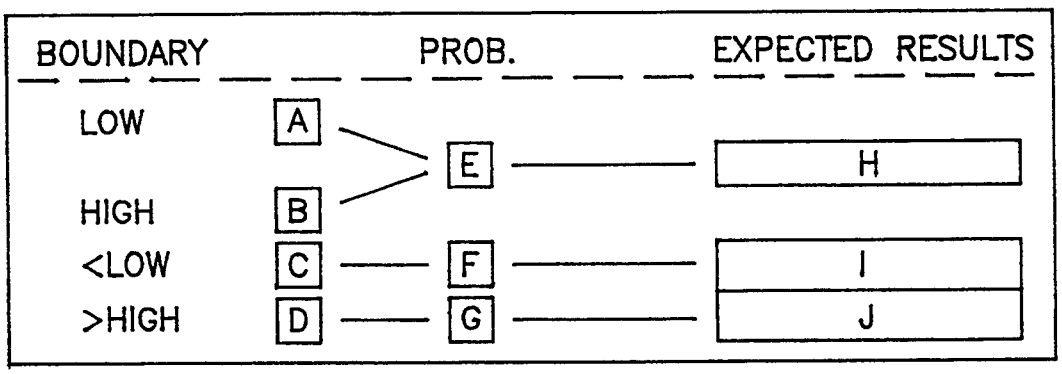

| BOUNDARY | PROB. | EXPECTED RESULTS |
|---|---|---|
| LOW | A | |
| | > E | H |
| HIGH | B | |
| <LOW | C — F | I |
| >HIGH | D — G | J |

LOOP:    DEFINES THREE LOOPS (A,B), C AND D. EACH LOOP (A,B), C AND D HAVE PROBABILITIES E, F AND G, RESPECTIVELY. ALSO, LOOPS (A,B), C AND D HAVE EXPECTED RESULTS H, I AND J, RESPECTIVELY.

A,B ARE INTEGERS (USERS ENTERED)
C,D ARE PLACE HOLDERS
E,F,G ARE INTEGERS BETWEEN 0 AND 100 (USER ENTERED)
H,I,J ARE STRINGS OF TEXT

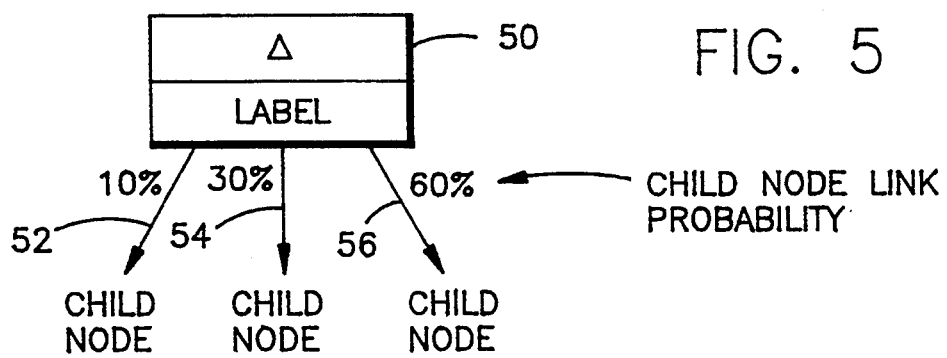

60 — CONTENT NODE

SYMBOL:    □   (SQUARE)
LABEL:     UNIQUE TIME (STRING)
DEFINITION:    NODE WHICH PLACES TEXT OR NUMBERS INTO TEST CASE
FACETS:    LOOP = NUMBER OF TIMES NODE REVISITED DURING EXECUTION

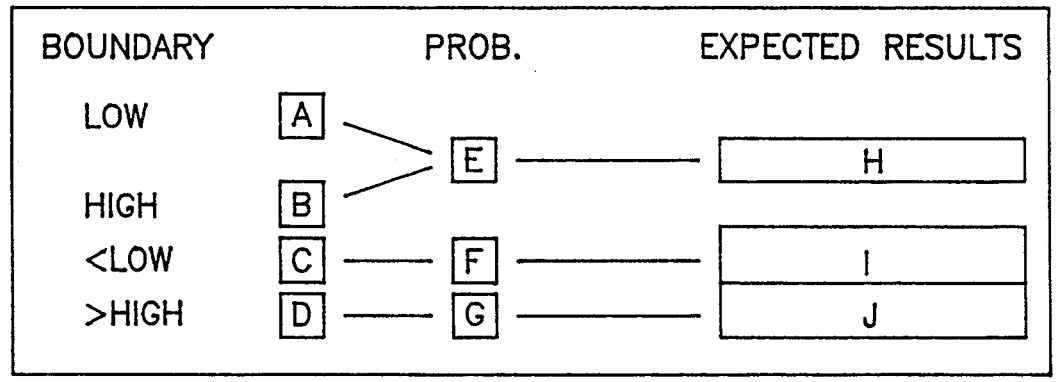

LOOP:    DEFINES THREE LOOPS (A,B), C AND D. EACH LOOP (A,B), C AND D HAVE PROBABILITIES E, F AND G, RESPECTIVELY. ALSO, LOOPS (A,B), C AND D HAVE EXPECTED RESULTS H, I AND J, RESPECTIVELY.
A,B ARE INTEGERS (USERS ENTERED)
C,D ARE PLACE HOLDERS
E,F,G ARE INTEGERS BETWEEN 0 AND 100 (USER ENTERED)
H,I,J ARE STRINGS OF TEXT

CONTENT NODE TYPE:    NUMERICAL SET OR ENUMERATED SET (SEE FIGS. 6B AND 6C, RESPECTIVELY)

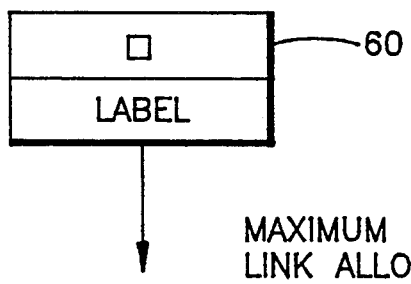

FIG. 7

MAXIMUM OF ONE LINK ALLOWED

ENUMERATED SET FACETS — 64

DEFINITION: PLACES TEXT IN TEST CASE

SET

| SET | PROB |
|---|---|
| $A_0$ | $B_0$ |
| $A_1$ | $B_1$ |
| $A_2$ | $B_2$ |
| ⋮ | ⋮ |
| $A_n$ | $B_n$ |

SET: CONTAINS A USER SPECIFIED n SETS $A_0, A_1, ..., A_n$ REPRESENT THESE SETS EACH

SET ( $A_0... A_n$ ) HAVE PROBABILITIES ($B_0...B_n$), RESPECTIVELY. $B_0...B_n$ MUST ADD UP TO 100

$A_0...A_n$ ARE STRINGS OF TEXT $B_0...B_n$ ARE INTEGERS BETWEEN 0 AND 100

DECISION NODE

SYMBOL: ◇ (DIAMOND)
LABEL: UNIQUE NAME (STRING)
DEFINITION: DIRECTS TRAVERSAL OF TREE DEPENDENT UPON CONDITION
FACETS:

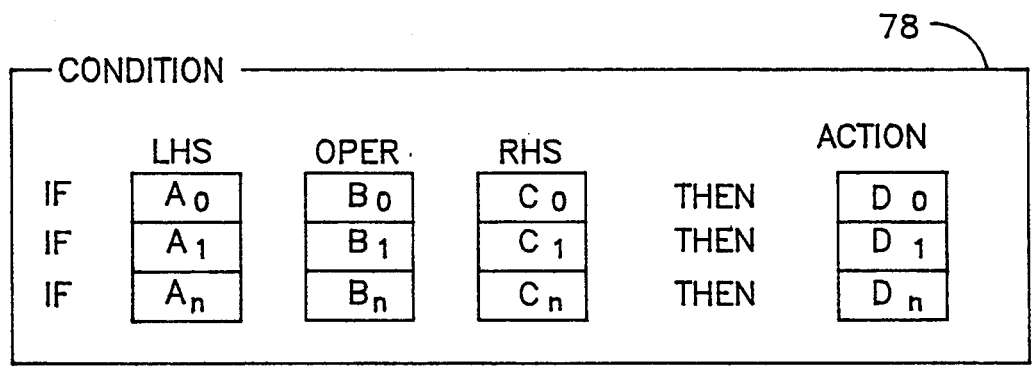

WHERE:
EACH CONDITION CONSISTS OF A, B, C AND D
LHS IS THE LEFT HAND SIDE (A LIST OF NODE LABELS)
OPER IS THE OPERATOR (<, >, <=, >=, <>(DIFFERENT THAN)
RHS IS THE RIGHT HAND SIDE (A LIST OF NODE LABELS AND OPTION TO SPECIFY STRING)
ACTION IS THE POINT WHERE THE TRAVERSAL WILL BE DIRECTED (A LIST OF NODE LABELS)
A, B, C AND D ARE USER SPECIFIED

DEFAULT ACTION: A LIST OF NODE LABELS. IF ALL CONDITIONS ARE FALSE THIS ACTION WILL BE TAKEN

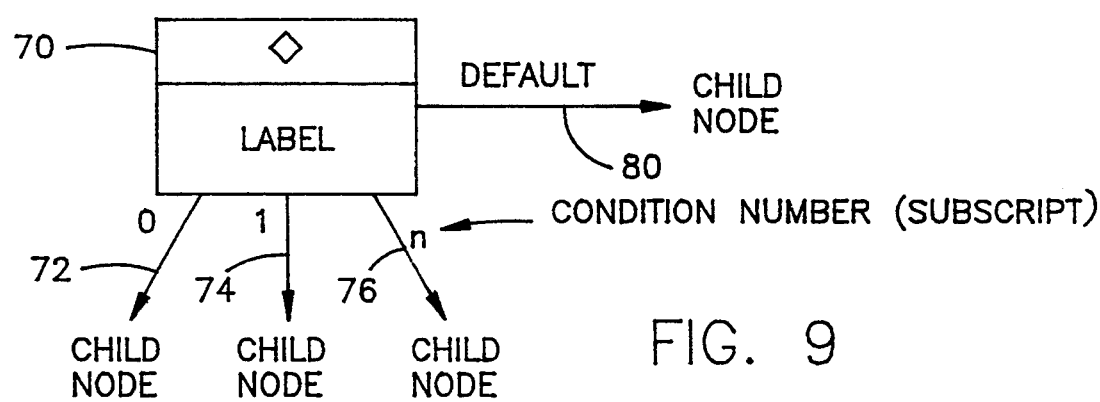

FIG. 9

GENERATES A PERSON'S NAME AND THEIR PHONE NUMBER
DATA IS :
    PAUL        333-4444
    BILL         555-1212
    JILL         666-0000

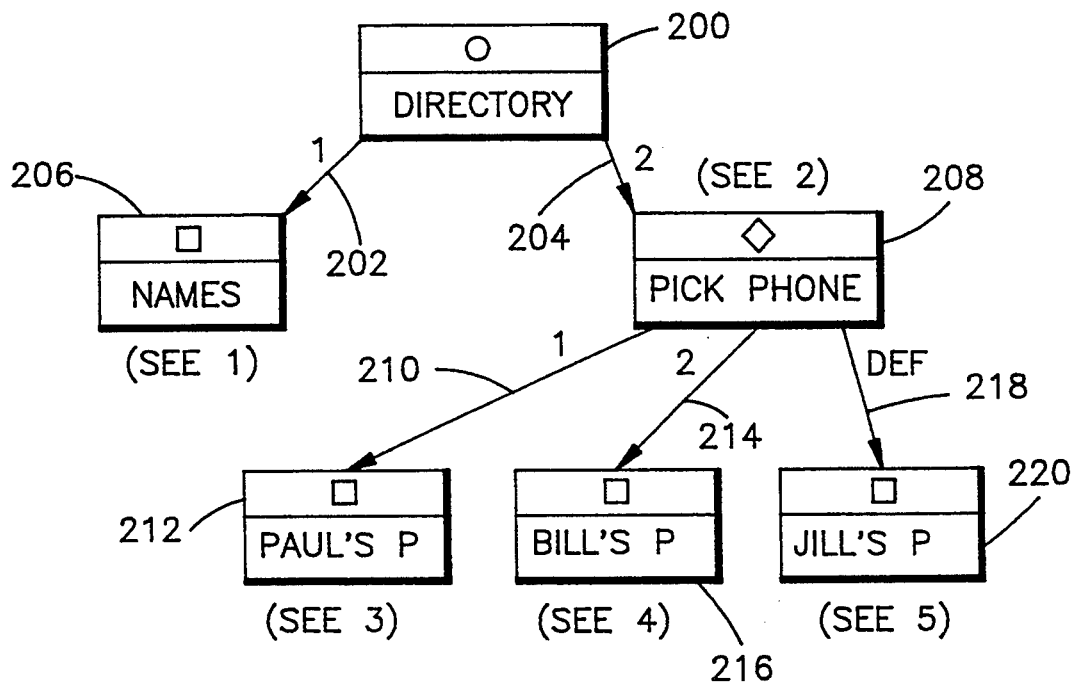

① LABEL : NAMES — ENUMERATED SET

| SET | PROB |
|---|---|
| 'PAUL' | 33 |
| 'BILL' | 33 |
| 'JILL' | 34 |

② LABEL : PICK PHONE
        CONDITION

| ORDER | LHS | OPERATOR | RHS | ACTION |
|---|---|---|---|---|
| 1 | NAMES | = | 'PAUL' | PAUL'S P |
| 2 | NAMES | = | 'BILL' | BILL'S P |
| | | | DEFAULT | JILL'S P |

③ LABEL : PAUL'S P — ENUMERATED SET

| SET | PROB |
|---|---|
| '333-4444' | 100 |

④ LABEL : BILL'S P — ENUMERATED SET

| SET | PROB |
|---|---|
| '555-1212' | 100 |

⑤ LABEL : JILL'S P — ENUMERATED SET

| SET | PROB |
|---|---|
| '666-0000' | 100 |

FIG. 13

SOFTWARE TESTING SYSTEM THAT EMPLOYS A GRAPHICAL INTERFACE TO GENERATE TEST CASES CONFIGURED AS HYBRID TREE STRUCTURES

FIELD OF THE INVENTION

This invention relates to systems for testing the operation of software products and, more particularly, to a software test system which employs a graphical user interface to enable automated generation of test case tree structures.

BACKGROUND OF THE INVENTION

The testing of software is normally the phase of software development which is assigned the fewest resources and given the shortest amount of time to accomplish its task. These facts translate to software products having poor quality and exhibiting low customer satisfaction. A major task of the software tester is to create test cases that exercise a software product and determine whether the software is able or unable to provide expected results. In the past, the generation of test cases was entirely manual, very complicated, and many times did not exhaust all of the test cases that were needed to be run. More recently, software testers have been embodied into semi-automatic and automatic test systems.

One such software system accepts as inputs, test cases expressed in the Backus-Naur form (a notation that specifies a programming language syntax) and automatically generates text files therefrom. Because the Backus-Naur form is a pseudo-like language and is very cryptic, users find it difficult to use. In U.S. Pat. No. 4,819,233 to Delucia et al., a test system is implemented by generating a test driver program which is compiled and linked to a source code listing to be tested. The source code is instrumented to generate, when the code is executed, an indication for each block of code that the statements of that block have been executed. Through a series of tests, all blocks of code are executed using a series of test cases. The Delucia et al system is a further example of the use of an input language to achieve the generation of test cases.

By contrast, U.S. Pat. No. 5,067,129 to Evans et al. and 5,187,788 to Marmelstein both employ graphical interface systems to enable generation of software packages. Marmelstein creates a graphical representation of a program, which representation is then directly converted to an operating code. The Marmelstein system provides three different, consistent views of the same program. With the first view, the programmer lays out the initial program package specifications. A second view allows the programmer to create and manipulate data structures and to define local variables. The last view enables the programmer to define the control flow of subprograms.

Evans et al employ a graphical interface to automatically generate test cases for the testing of a service processor associated with a computer. The Evans et al. system includes a knowledge base that stores a map indicating a correct arrangement of screens, which screens are stored by the computer. A program generator is coupled to the user interface and the knowledge base and identifies from the computer's memory, screens in a group. The program generation further directs the service processor to call up screens of the group and to test the pathing between the screens by comparing expectations of test programs to the screens actually called up.

Evans et al. employ a classical tree structure to define the test cases. Such a tree structure has the following attributes; nodes-inherit attributes from their parents; all nodes have the same attribute formats; nodes cannot have multiple parents; nodes can have multiple children; and a tree must have at least one root node. In such a tree structure, a node is an "object" containing data and is generally represented by a polygon in the diagram. A "link" is a defined relationship among nodes and is represented by a line with an arrow. The arrow points to the child of the relationship. A root node is a node which does not have a parent.

While pure tree structures can graphically show test cases, they exhibit a number of shortcomings. First, they are unable to handle probabilities which define the likelihood of a particular branch of the tree being employed in a test case. Second, a pure tree can only generate one combination of circumstances and becomes extremely complex when required to illustrate plural combinations of test cases.

A further known method for the generation of test cases is through the use of cause-effect graphs. (See "Art of Software Testing", G. Myers, John Wiley & Sons (1979) Such graphs enable combinations of input conditions to be derived for test cases. The testing of combinations of input conditions is not simple since the number of combinations is usually very high. Cause-effect graphs employ nodes and links and, further employ logical operators such as AND, OR, and NOT. To derive a cause-effect graph, the software specification is divided into "workable" pieces because otherwise, a cause-effect graph becomes unwieldy. Causes and effects are then identified, with a cause being a distinct input condition or a class of input conditions and an effect being an output condition or a system transformation. The semantic context of the specification is then analyzed and transformed into a Boolean graph that links the causes and effects (i.e. the cause-effect graph). The graph is then annotated with constraints describing the combination of causes and/or effects that are impossible. The graph can then be utilized to generate the software test cases.

Cause-effect graphs have different attributes than classical tree structures. Nodes do not inherit from their parents; there are different types of nodes with different types of attributes; a root node does not have to exist; and nodes can have multiple parents and multiple children. As a result, cause-effect graphs can quickly become extremely complex, difficult to comprehend, and unwieldy to implement on a graphical user interface. Additionally, the logical operators that are specified neither accommodate probabilities nor enable loops.

Accordingly, it is an object of this invention to provide an improved system for generating test cases for software cases.

It is another object of this invention to provide an automated system for generating test cases which can be implemented with a graphical user interface.

It is yet another object of this invention to provide an improved system for generating software test cases which can accommodate probability functions and multiple repetitions of test cases without creating unduly complex test case representations.

SUMMARY OF THE INVENTION

A data processing system enables a user to generate test cases that exercise a program under test. The data processing system includes a display, a keyboard input and memory for storing a library of node types including AND, OR, Decision and Content nodes, node linking data and a graphical user interface procedure. A central processor controls the display, input keyboard and memory and in response to user inputs, creates a data base in memory that defines a hybrid tree structure that includes a plurality of node data structures. Each AND node data structure is connected by links to a plurality of child node data structures, each link to a child node data structure defining a sequence order value among all child node data structures linked to the AND node data structure. Each sequence order value defines a position in a sequence in which information is placed in the test case by traversal of the associated child node data structure. OR node data structures include an ability to set probabilities of visitation during traversal of a tree structure and Content node data structures enable definitions of a numerical set range and a probability that a randomly chosen value will be inside or outside the range. All AND, OR and Content node data structures have a looping attribute which defines how many times the node and its children will be revisited during execution of the tree structure.

DESCRIPTION OF THE DRAWINGS

FIG. 2 is a diagram illustrating the attributes of an AND node;

FIG. 3 illustrates diagrammatic aspects of an AND node;

FIG. 4 is a schematic diagram illustrating attributes of an OR node;

FIG. 5 illustrates diagrammatic aspects of an OR node;

FIG. 6A is a diagram illustrating attributes of a Content node;

FIG. 6C a diagram illustrating the enumerated set facets of a Content node;

FIG. 7 illustrates diagrammatic aspects of a Content node;

FIG. 8 is a diagrammatic illustrating attributes of a Decision node;

FIG. 9 illustrates diagrammatic aspects of a Decision node;

FIG. 13 is an example of a tree structure that incorporates nodes and attributes of the invention;

DETAILED DESCRIPTION OF THE INVENTION

The invention enables a user to construct a hybrid tree structure which generates test cases for the testing of software programs. It is to be understood that the hybrid tree structures do not, per se, operate to perform the test case, but rather provide input data for a software test execution program. As will be hereafter seen, the tree structure employed by the invention includes aspects of both a pure tree structure and a cause-effect graph and is thus turned a "hybrid" tree structure. Furthermore, the hybrid tree structure includes attributes which enable traversals of various portions of the tree structure control under control of a probability calculation. More specifically, the percentage of times that the number of traversals of a branch will be within preset boundary values is controlled by a user-prescribed probability value. The hybrid tree structure also includes attributes which enable child nodes depending from a parent node to be visited either in a preset sequence or to be visited based upon still a further probability calculation. Lastly, data inputs are enabled by two Content node types, with certain data values within a prescribed range being used in a test case dependent upon a predefined probability calculation. At other times data values will be used in the test case, based upon a different probability value. In either case, the test case employs the calculated data values-thereby enabling a program under test (PUT) to be thoroughly exercised and evaluated.

Figure 1:
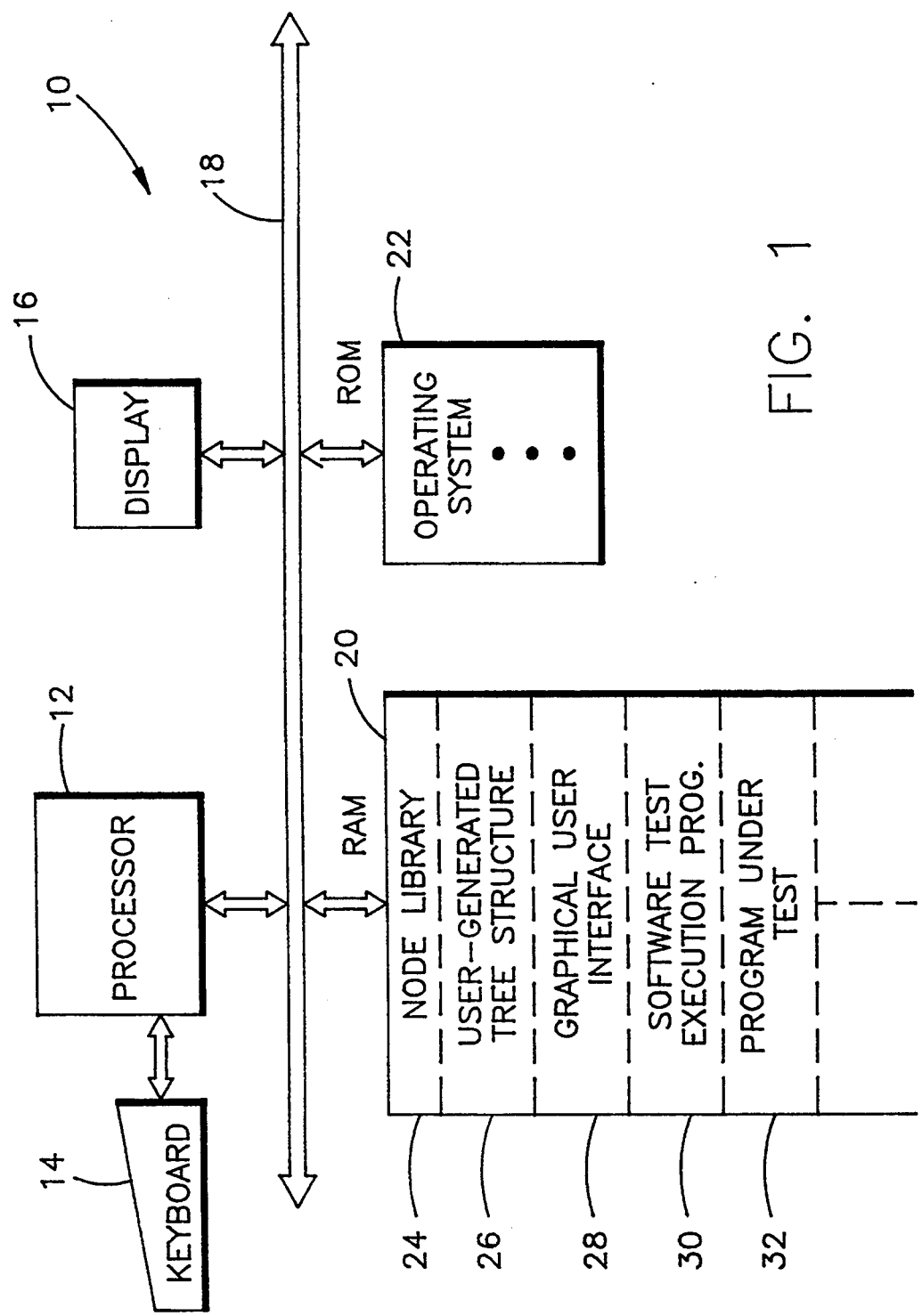
FIG. 1 is a high level block diagram of a system incorporating the invention hereof.

In FIG. 1, a data processing system 10 is shown which enables generation of the hybrid tree structure discussed above. Data processing system 10 is controlled by a processor 12 which includes a user keyboard input 14. In accordance with user inputs, a display 16 indicates various nodes, nodal data structures and tree structures that are in process of construction by the user. A bus 18 provides communication between the various elements of data processing system 10 and further connects to a random access memory (RAM) 20 and a read only memory (ROM) 22.

Within RAM 20 are a number of memory areas which are used for specific code portions that enable generation of the hybrid tree structure and provide for its execution during the testing of a PUT. More specifically, node library area 24 includes software which defines a plurality of node data structures, each data structure defining a particular type of node (i.e. an AND node, an OR node, two types of Content nodes, and a Decision node). Also in RAM 20 is an area 26 reserved for storage of a user-generated hybrid tree structure.

To enable the user to interact with both node library 24 and RAM area 26, a graphical user interface software area 28 is provided in RAM 20. One such graphical user interface is the "OS 2" operating system, a product of the International Business Machines Corporation, Armonk, N.Y. In RAM area 30 a software test execution program is stored which enables execution of the user-generated hybrid tree structure during the testing of a program contained in RAM area 32. One acceptable software test execution program is the "WorkStation Interactive Test Tool" (WITT) Version 1.1, program product No. SC26-4677-0, marketed by the International Business Machines Corporation, Armonk, N.Y. The WITT program operates the PUT and exercises its functions using test case data inputs derived from the user-generated hybrid tree structure in RAM area 26.

As above indicated, the invention employs four types of node data structures. An AND node places information into a test case via all linked child nodes, in the order assigned to the links that connect to the child nodes. An OR node places information into a test case via one and only one child node, based upon an assigned probability value to the link which connects the child node to the OR node. A Content node is a node which places actual text or numbers into the test case and is the only node type which enters data. There are two types of Content nodes, e.g. one type which inputs numerical sets and one type which inputs enumerated sets. The numerical set Content node inputs a number into the test case which is randomly selected from within user-defined upper and lower boundaries. An enumerated set Content node places text in the test case. A Decision node directs traversal of the hybrid tree structure, the direction of traversal being dependent upon the fulfillment of a condition that is defined within the Decision node.

Referring now to FIGS. 2–9, each of the node types and their attributes will be hereafter described. It is to be understood that the term "facet" will be used to hereafter describe attributes of each node data structure.

FIGS. 2 and 3, illustrate details of an AND node data structure. When a user calls an AND node data structure from node library 24, an AND node appears on display 16 as shown by the example in FIG. 3. The AND node is configured as a box 30 and includes a symbol area 32 which includes a "0" (indicative of an AND node) and a label area 34 that includes a user specified unique name (e.g. a string of characters). Those skilled in the art will realize that each node is, in software terms, an "object" that is uniquely identified by its name.

Depending from AND node 30 are a plurality of links 36, 38, 40, etc. that are represented by lines with arrows pointing to a linked child node. Each of links 36, 38 and 40 is an object, in itself, and is identified by a label. Each link from an AND node includes a facet that identifies an order in which it will be traversed during execution of a test case. For instance, link 36 will be traversed first during execution of the test case, followed by traversals of links 40 and 38, in that sequence. Each time a link is traversed, all child nodes which depend from the child node associated with that link and extending further down the hybrid tree structure are also traversed. An attribute of the AND node is that all links 36, 38 and 40 are required to be traversed during the execution of a hybrid tree structure test case.

In FIG. 2, an AND node data structure is further detailed. As indicated above, an AND node causes information to be placed into the test case that is contained in all depending child nodes in the order assigned to the links that connect to the child nodes. The child node link order is an assigned sequence of visitations to each child node and is represented by an integer. While the child node link order is indicated in FIG. 2 as part of the AND node data structure, it will normally appear in a data structure defining a link. Nevertheless, to avoid over-complication, link facets are described in conjunction with facets of node structures with which they are associated.

Each AND node data structure includes a facet termed a "loop" that defines a number of times the particular node is revisited during execution of the test case. A loop facet occurs in each AND node data structure, OR node data structure, and in both types of Content node data structures (to be described below). The loop facet relies upon user-entered numeric boundaries which an execute program employs during traversal of the hybrid tree structure. More specifically, boundary values are employed by the execute program in conjunction with user-assigned probability values. The probability values determine the percentage of times that a random number calculated by the execution program will fall within the preassigned boundaries or will fall below an assigned lower value boundary or above an assigned upper value boundary.

When the AND node data structure is displayed, a box 42 appears on display 16 with areas that enable value entries to be made. Values A and B define lower and upper values, respectively, which define the loop value boundaries. Those values define a range within which the result of a random number of calculation will fall a predefined percentage of times the loop value is calculated. The probability value is a user-entered value E. If it is assumed that E equals 0.5, then when the loop facet is calculated, the resultant value will be between values A and B at least 50% of the time. Probability values F and G define the percentage of times that the calculation will result in a loop value that is either lower than the range defined by the A and B values or higher than the range defined by the A and B values. If it is assumed that F is 0.25 and G is 0.25, then a quarter of the calculations of the loop facet will be lower then the range A to B and a quarter will higher than the A to B range. Thus, the first time an AND node is visited during an execution of a hybrid tree structure, the loop facet is calculated and, depending upon probability values E, F and G, a loop value is derived. That value controls the number of times the AND node is revisited during the execution of the hybrid tree structure.

For each user-assigned probability value, an expected result may be input by the user into the data structure. The expected result inputs H, I and J are values, strings or characters and define an expected result that will occur, during a loop. An expected result value enables the execution program to perform comparisons between an intermediate PUT result and the expected result. This enables "microscopic" analysis of various portions of the test case and an assessment of the operation of the PUT.

If it is assumed that each of the child nodes connected to an AND node is a Content node, then data from the Content node with the smallest order assigned to its link will be placed first into the test case. Next, the child Content node connected by the next higher order link will be placed into the test case, etc. By definition, all Content nodes connected to an AND node have their data inserted into the test case in the order of their assigned links. The number of times the AND node is exercised is defined by the loop facet as described above.

FIGS. 4 and 5 illustrate details of an OR node data structure. When a user calls an OR node data structure, an OR node 50 is displayed as shown in FIG. 5 and is illustrated with a triangle in its symbol portion. An OR node also includes a label section that uniquely identifies it. Each of links 52, 54, and 56 connects to an assigned child node and includes an assigned probability value which determines the probability that the associated child node will be traversed during execution of the test case.

As shown in FIG. 4, an OR node is a node which places information contained in one child node into a test case. That placement is based upon a probability value assigned to the link connecting the child node to the OR node. The child node link probability is a user input value. It is to be understood that the child node link probability is different from the loop facet probability which controls the number of times the OR node is revisited during execution.

The child node link probability value is calculated during each traversal of OR node data structure 50 and determines which of the child nodes will be next traversed. More specifically, one of the links that depends from OR node 50 is selected in accordance with its assigned probability value. Thus, referring back to FIG. 5, link 52 will be chosen 10 percent of the time, link 54 30% of the time and link 56 60% of the time. As a result, the child node having the highest link probability will have the greatest likelihood of occurring in the test case, with other child nodes having lesser likelihoods of occurrence.

Turning now to FIGS. 6A–6C and 7, the two types of Content nodes will be described. As shown in FIG. 7 a Content node 60 is illustrated on the display by a block that includes a square in its symbol section. As with all other nodes, a Content node is identified by a unique label. There is only a maximum of one link allowed for a Content node to a child node. That link enables additional data to be inserted into the test case in conjunction with the data inserted by Content node 60.

As above indicated, Content nodes are the only nodes which place text or numbers into the test case. All of the other nodes (i.e. AND, OR, Decision) direct traversals of a test case hybrid tree structure and do not actually enter data into the test case. Each Content node includes a loop facet that is identical to that described above for the AND and OR nodes.

Figure 6B:
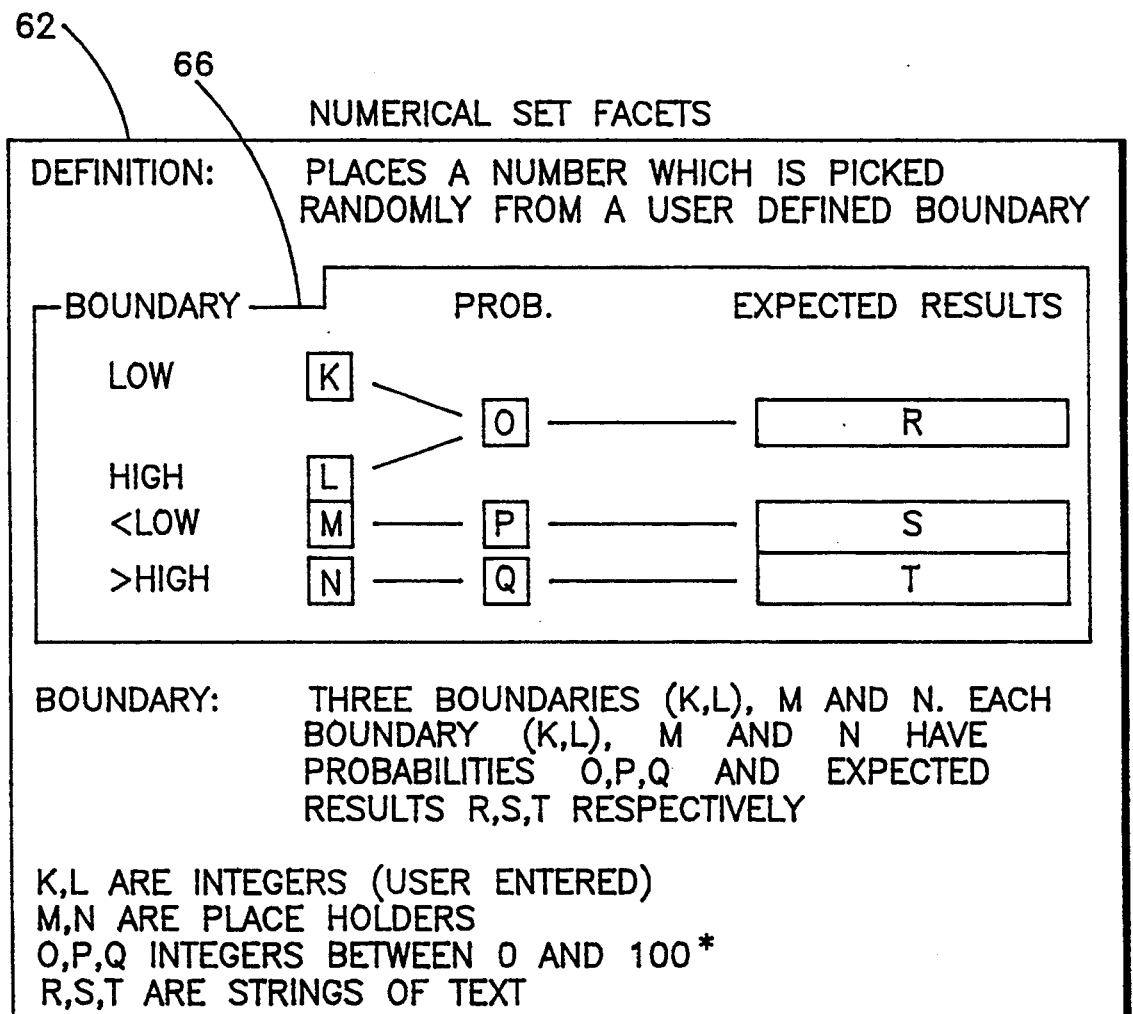
FIG. 6B is a diagram illustrating the numerical facets of a Content node.

There are two types of Content nodes, one which enters a numerical set and one which enters an enumerated set. In FIG. 6B, the data structure of a numeral set type Content node is shown at 62 and an enumerated set type Content node is shown in FIG. 6C at 64. The numerical set type Content node (FIG. 6B) allows a user to define a numerical range, with a number then being generated within the numerical range, based upon a user input probability value. By inside the range, is meant that the number is greater than or equal to the smallest number that defines the lower boundary of the range and less than or equal to the largest number which describes the higher boundary of the range. The enumerated set type Content node (FIG. 6C) allows a user to define a collection of strings or characters to be picked from at execution time. The user can also create a collection of numbers which will be selected from at execution time.

Turning first to the numerical set type Content node (see 62 in FIG. 6B), that node type causes a number to be picked randomly from within user-defined boundaries, depending upon a chosen probability. As shown at 66, a Content node of the numerical set type displays for user view, a boundary definition box. The user then enters lower and higher boundary values K and L and assigns a probability value "O" thereto. Probability values "P" and "Q" control the probability that a number is generated which is below lower boundary K or above upper boundary L. Thus, each time a numerical set type Content node is traversed, a number will be generated that will fall within the range between K and L a percentage time defined by probability "O". If it is assumed that "O" equals 90%, then the calculated value will fall within the range defined by K and L, 9 out of 10 times. This will assure that a random number between values K and L will be inserted into the test case 9 of the 10 times the Content node is traversed. At other times, values either lower or higher will be inserted into the test case, depending upon assigned probabilities P and Q.

As with the loop factor, expected result values R, S and T are associated with the respectively assigned probabilities 0, P and Q. Those expected results enable a comparison of the test case results occurring at the time of traversal of the Content node with the expected result values and provide an ability for detailed analysis of intermediate results during execution of the program under test. In each of the Content, AND and OR node types, all probabilities must add up to 100% so as to avoid indeterminate situations.

The enumerated set type Content node places text into the test case. As shown at 64 in FIG. 6C, text sets $A_0$–$A_n$ will be respectively inserted into the test case in accordance with assigned probabilities $B_0$–$B_n$, respectively. $B_0$–$B_n$ are integer values between 0 and 100 which define the probability of a particularly associated text string being inserted into the test case. $B_0$–$B_n$ add up to 100%.

One skilled in the art will understand that the invention's provision of probability values to enable selections from either numerical ranges or from sets of text characters enables many combinations of data to be inserted into a test case. Furthermore, Content nodes only need to be defined once and then are executed in accordance with the node's definition each time the Content node is traversed.

This greatly simplifies the user's problem in constructing the hybrid tree structure and provides for substantial flexibility in the testing of a PUT. In addition, the probability assignment to the loop facet of each of the AND, OR and Content node data structures enables particular aspects of the hybrid structure to be exercised a number of times, defined by the probability values. Substantial flexibility is thus achieved in the structuring of the hybrid tree structure, without requiring complex extensions of its length. Assigned probabilities (and ranges of number values and text strings) enable a test case to be constructed which approximates the way a customer will employ an application and enables testing of the application, while also providing for test cases to be exercised on a lower probability basis.

FIGS. 8 and 9 illustrate a node data structure for a Decision node. In FIG. 9, the display form of a Decision node 70 includes a diamond symbol representation and, consistent with other nodes, a label portion which uniquely defines the Decision node. In essence, a Decision node directs traversal of the hybrid tree structure in dependence upon the occurrence of a condition. The condition is normally expressed as an equation comprising a left hand side (LHS), which may be one or more node labels, an arithmetical operator, and a right hand side (RHS) which may be a list of node labels or a string of characters. For each condition expressed as an LHS-operator-RHS, a resultant action is defined.

As shown in FIG. 9, a Decision node includes a plurality of links 72, 74, 76 to respective child nodes. Each link is identified by a condition number subscript that is defined in Decision node data structure 70 shown in FIG. 8. Box 78 indicates the format which is displayed and enables the user to enter conditions, operators and actions which define the functioning of the Decision node. Values A, B, C, and D are user specified and respectively define the Left hand Side of the condition statement, a chosen operator, and the right hand side of the condition statement. The Action column determines what action occurs upon fulfillment of the associated condition statement. The LHS of a condition statement defines a specific node label (indicating that the value from that node is the LHS of the condition statement. The operator may be one of the following: <, >, <=, >=, <> (different than). The RHS may specify another node label from whence a value is to be obtained. The action will define a link to be chosen to a child node, depending upon the fulfillment of the resultant condition.

A Decision node data structure also includes provision for a default action which is a node label of a link to a child node that is chosen if all conditions shown in box 78 are false. Such a default link is shown at 80 in FIG. 9.

Figure 10:
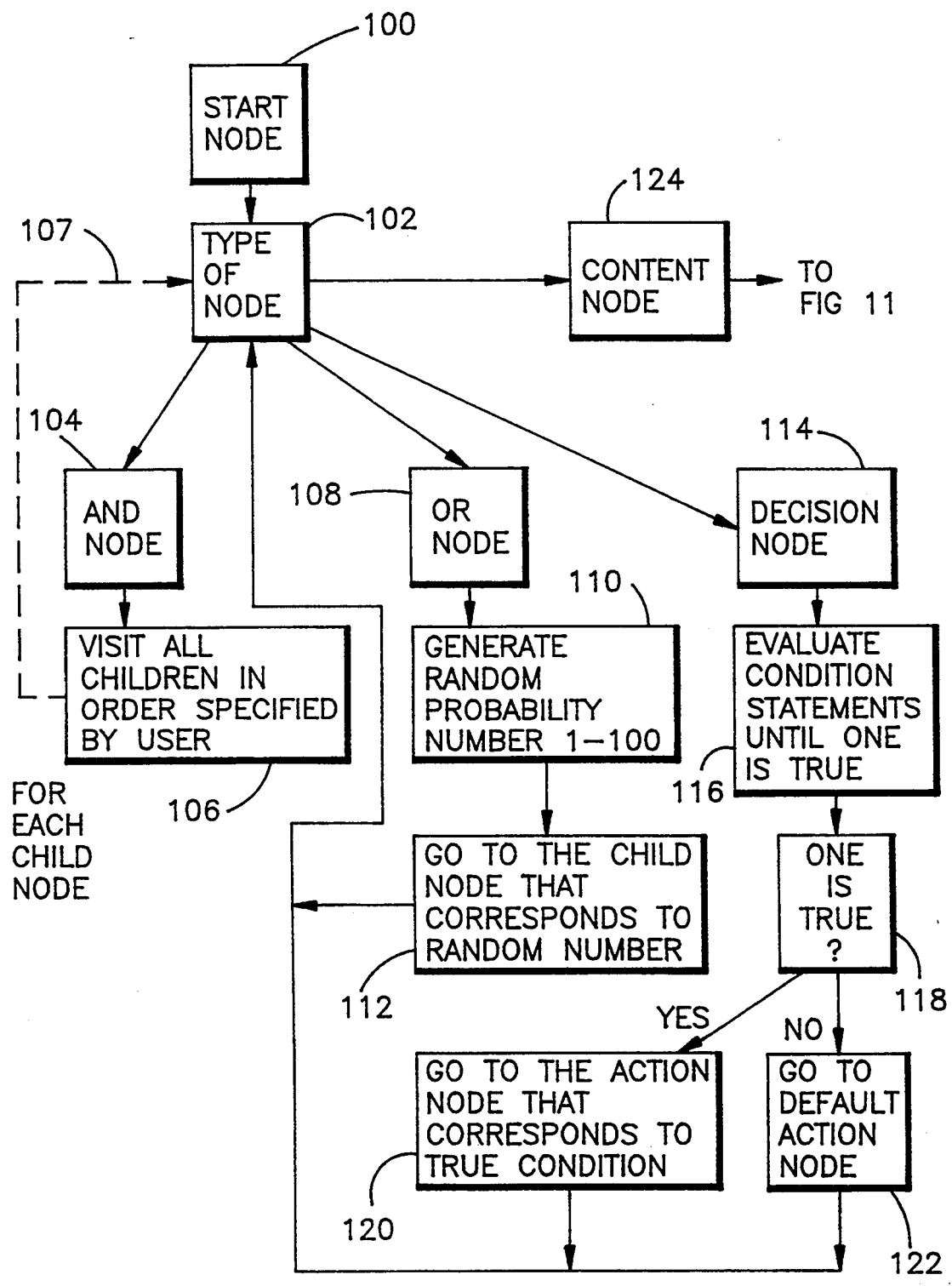
FIG. 10–12 illustrate procedures followed by the system of FIG. 1 upon encountering an AND node, an OR node, a Decision node or a Content node.
Figure 11:
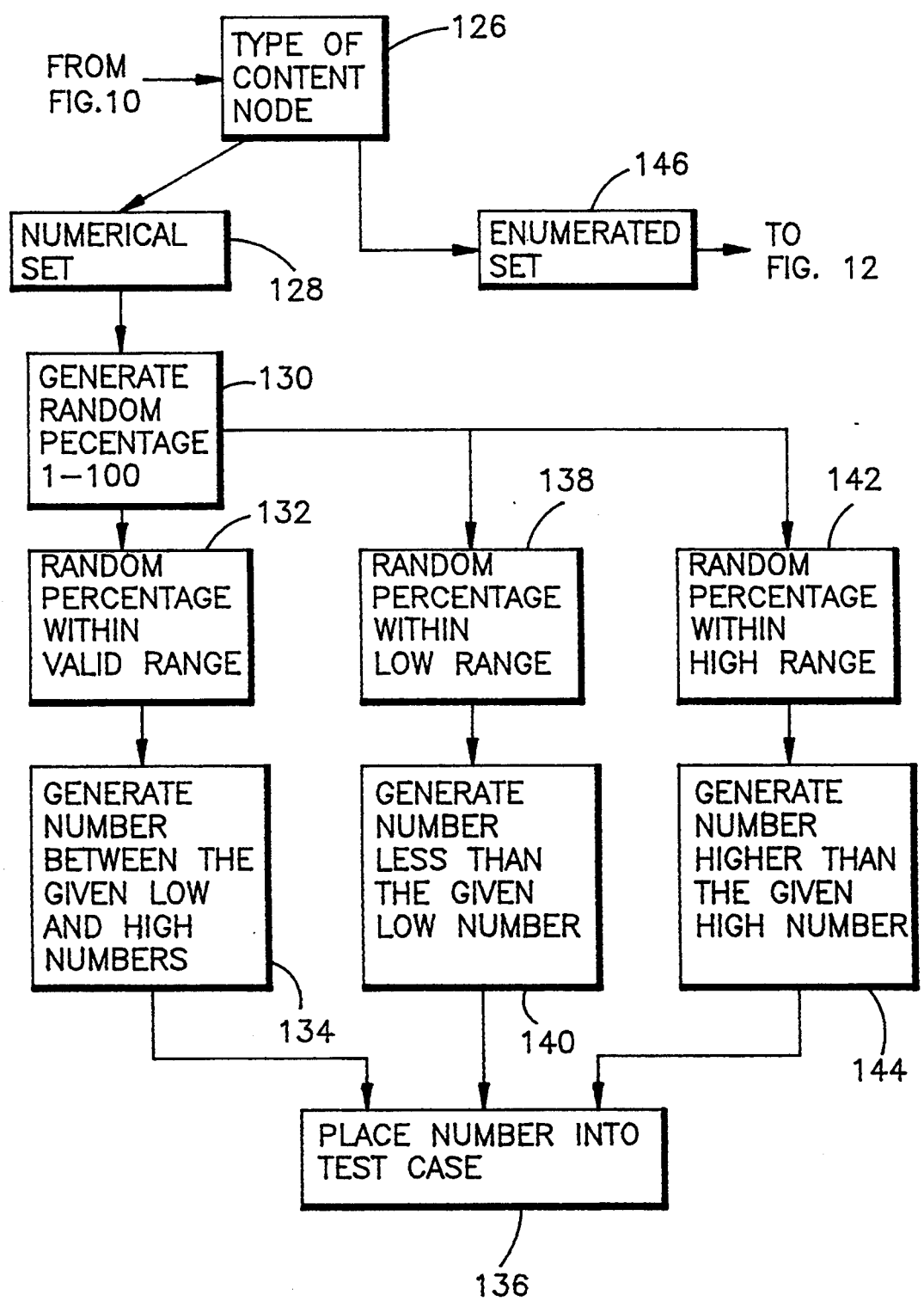
Figure 12:
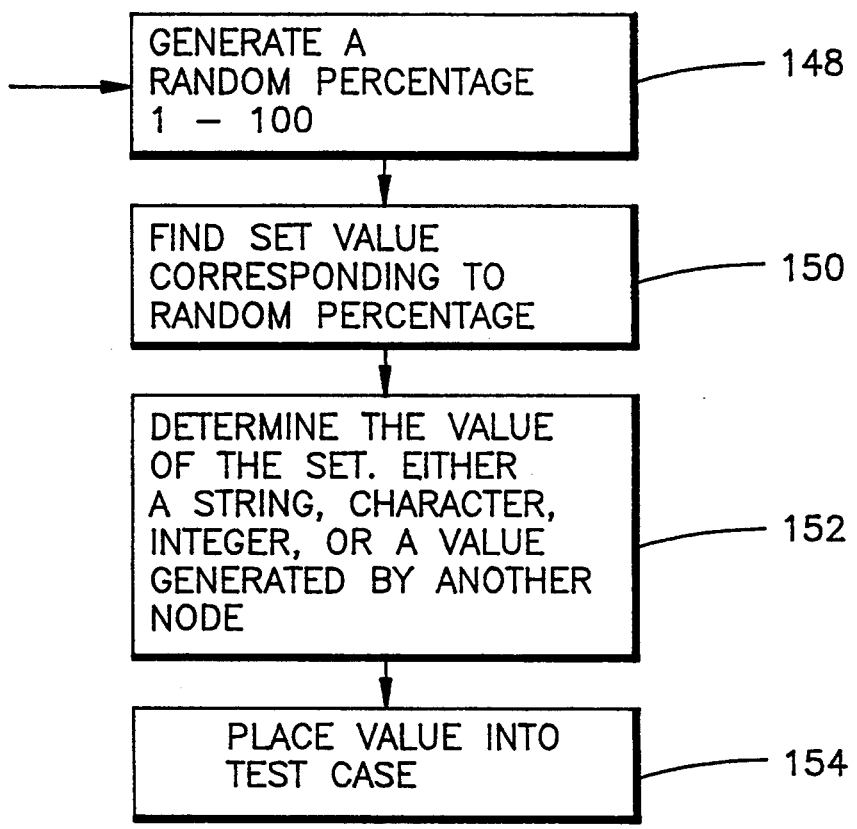

The flow diagrams of FIGS. 10–12 illustrate the procedure followed during an execution of a hybrid tree structure constructed of the node data structures described above. To commence operation, the user defines a node where execution begins (box 100, FIG. 10). Next, the type of node is determined (box 102) and, dependent upon the determination, the procedure moves down four parallel paths. If it is determined that the node is an AND node (box 104) then all children of the AND node are visited in the order specified by the user (box 106). The child node to be traversed that depends from an AND node is determined as to type and all further child nodes which depend from it are then traversed before the next child node in the specified order is traversed. That operation is indicated by dotted line 107 which circles back to box 102.

At any time the type of node is determined to be an OR node (box 108), a random probability is generated of a number between 1 and 100 (box, 110). That random number is then employed to control traversal to a child node that is connected to the OR node by a link which has a corresponding random number value or percentage (box 112). This action will be better understood from the following example. Assume 3 child node links depend from an OR node and are assigned probabilities 15%, 30% and 55%, respectively. If the random number is in the range 0–15, the 15% link is chosen. If the random number is in the range 16–45, the 30% link is chosen, and if the random number is in the range 46–100, the 55% link is chosen. The procedure then circles back to determine the type of node of the child node and proceeds as indicated.

If the type of node is determined to be a Decision node (box 114), the condition statements defined in the Decision node data structure are evaluated (box 116) until one is found to be true. Assuming that one is found to be true (box 118), the procedure moves to the action node that corresponds to the true condition (box 120). The action node is defined by the user inserted node label in box 78 in the Decision node data structure shown in FIG. 8. The procedure then cycles back to again determine the type of node (box 102). If none of the condition statements are found to be true (box 118), then the default node is traversed (Box 122) and its node type is determined (box 102), etc.

If the type of node is found to be a Content node (box 124), then the type of Content node is next determined (box 126). If the type is found to be a numerical set type Content node (box 128), a random percentage between 1 and 100 is generated (box 130). If the random percentage is found to be within the valid range (box 132), a number is generated between the given low and high numbers (box 134) and placed into the test case (box 136). If the random percentage is within the low range (i.e. lower than the low boundary value) (box 138), a number is generated that is less than the given low boundary number (box 140) and that value is placed into the test case (box 136). By contrast, if the random percentage generated is higher than the upper boundary limit (box 142), then a number is generated that is higher then the given high value boundary number (box 144) and that value is placed into the test case (box 136).

If the type of Content node is found to be an enumerated set (box 146), the procedure moves to FIG. 12 and box 148 where a random percentage between 1 and 100 is again generated. The set values are then examined to determine a set whose value corresponds to the generated random percentage (box 150). The set value is then determined, i.e., it is either a string, integer, or a value generated by another node (box 152) and that set is placed into the test case (Box 154). It is important to realize that this procedure enables not only a set from within the Content node to be inserted into the test case but also a value from another node to be accessed and used in the test case.

In FIG. 13, a simple hybrid tree data structure is illustrated to provide an example of the type which would be constructed by a user. The input data is as shown and includes three names i.e. Paul, Bill and Jill and their respective phone numbers. Node 200 is an AND node and is defined by the label "directory". Depending from node 200 are two links 202 and 204 which are assigned a sequence of traversals 1 and 2, respectively. Link 202 connects to a Content node 206 having the label "names". Content node 206 is of the enumerated set type, the set being defined as the names Paul, Bill and Jill, each having an assigned probability of 33%, 33% and 34% Thus, during a first traversal of Content node 206, there is an equal probability that any one of the names Paul, Bill and/or Jill will be inserted into the test case.

Upon a next traversal of AND node 200, link 204 is visited and causes Decision node 208 to be accessed. That node is identified by the label "pick phone" and includes the conditions specified in note 2. In specific, if the choice of name in Decision box 206 is Paul, then the action is to traverse link 210 and access Content node 212. Node 3 indicates that the set value is Paul's phone number and that it will be chosen 100% of the time.

If, by contrast, Decision node 208 determines that Content node 206 has chosen Bill's name, then the action causes link 214 to be traversed to access Content node to 216 containing Bill's phone number. In a similar fashion, if neither of the conditions specified in Decision box 208 are fulfilled, then link 218 is traversed to a default Content node 220 wherein Jill's phone number is found.

As can be seen from the above, a hybrid tree structure incorporating the invention hereof enables a user to make changes in one location in the tree structure that will effect all test cases that are generated. Large quantities of test cases can be generated from a small collection of nodes and defined links.

The AND node data structure may be configured as a catalog that consists of many commands. Such a data structure is accomplished by linking the AND to a series of child nodes, each child node having a successive command to be executed. This type of catalog enables the user to define the syntax or format of the data that is to be generated. The format may then be referenced from the tree structure and frees the user from needing to redefine the syntax at each node.

The invention allows the user to enter the input and expected output of the program under test in the form of hybrid tree structures. These tree structures require the user to divide the input and output of the program into pieces. The pieces become nodes and the relationships between the pieces become links of the tree structure. Finally, the user is able to define expected results for each node where the expected results are defined as events of the program.

Once the test case is generated, organization of test cases is important. Each node may be assigned an additional attribute or facet called "bucket". A bucket is a directory within a DOS environment titled "bucket name". When a test case is generated containing a node defining bucket, the test case is placed into the directory identified by the bucket attribute. In addition to the bucket name, a precedence attribute may be included in each node. If a test case contains two or more nodes defining different bucket names, the precedence value is used as a tie-breaker. The node can containing the largest integer value in the precedence field is the bucket where the test case will be placed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A data processing system for enabling a user to generate test cases for testing a program, said data processing system comprising:

a display;

input means;

memory for storing a library of nodes including AND, OR, Decision and Content nodes and for further storing graphical user-interface procedures for enabling a user to display, create and change said nodes; and processor means coupled to said display, input means and memory and responsive to user inputs to create in said memory a data base defining a tree structure that includes a plurality of said nodes, each node comprising a node data structure, each AND node data structure connected by links to a plurality of child node data structures, each link defining a sequence order value among all said child node data structures depending from said AND node data structure, each said sequence order value determining an order in which information is placed in said test case by a said child node.

2. The data processing system as recited in claim 1 wherein said processor means assures that all said child node data structures depending from said AND node data structure are traversed in said sequence order before execution of said test case is complete.

3. The data processing system as recited in claim 1 wherein each said AND node data structure includes loop variable data that is interpreted by said processor means to control a number of times said AND node data structure and depending child nodes are traversed during an execution of said test case.

4. The data processing system as recited in claim 3 wherein said loop variable data comprises a range of loop values, said range defined by high and low loop values, and further comprises associated probability values which determine a probability that a number of loops calculated by said processor means will lie within said range, be less than said range or be greater than said range.

5. The data processing system as recited in claim 4 wherein said AND node data structure further comprises expected result data that are dependent upon a said calculated number of loops, whereby during execution, said expected result data is used to confirm operability of at least an intermediate portion of said program.

6. The data processing system as recited in claim 1 wherein a said OR node data structure is connected by plural links to a plurality of child node data structures and upon a tree traversal, is operable to place in one said test case information contained in one child node data structure, each said link including an associated probability value, said processor means randomly selecting one said link to a child node data structure from among said plural links, said selecting occurring in accordance with said link's associated probability value.

7. The data processing system as recited in claim 6 wherein each said OR node data structure includes loop variable data that is interpreted by said processor means to control a number of times said OR node data structure and depending child nodes are traversed during an execution of said test case.

8. The data processing system as recited in claim 7 wherein said loop variable data comprises a range of loop values, said range defined by high and low loop values, and further comprising associated probability values which determine a probability that a number of loops calculated by said processor means will lie within said range, be less than said range or be greater than said range.

9. The data processing system as recited in claim 8 wherein said OR node data structure further comprises expected result data that are dependent upon a said calculated number of loops, whereby during execution, said expected result data is used to confirm operability of at least an intermediate portion of said program.

10. The data processing system as recited in claim 1, wherein a said Content node data structure is operable upon a tree traversal, to place a test value in said test case, said test value derived from a defined range of values and determined based upon prescribed probability values, said probability values determining the probability that said test value, when calculated by said processor means, is within said defined range, above said defined range or below said defined range.

11. The data processing system as recited in claim 1 wherein data contained in a Decision node includes a condition statement which, upon fulfillment, directs said processor means to another node data structure in said tree structure, said data in said Decision node further enabling reference to other node data structures so as to enable logical comparisons with character strings and/or values in said other node data structures for determination of operability of at least an intermediate portion of said program.

12. The data processing system as recited in claim 10 wherein said data in said Decision node is enabled to reference a Content node data structure and to access from within said Content node data structure a value that is determined based upon a probability calculation.

13. A data processing system for enabling a user to generate test cases for exercising and testing a program under test, said data processing system comprising:

a display;

input means;

memory for storing a library of node data structures including AND, OR, Decision and Content nodes and for further storing graphical user-interface procedures for enabling a user to display, create and change said nodes;

processor means coupled to said display, input means and memory and responsive to user inputs to create in said memory a data base defining a tree structure that includes a plurality of said nodes, each node comprising a node data structure, each Content node data structure including data for entry into said test case, and each Decision node data structure including a condition statement which, upon fulfillment, directs said processor means to another node data structure in said tree structure, said Decision node data structure further enabling reference to other node data structures so as to provide logical comparisons with character strings and/or values in said other note data structures for determination of operability of at least an intermediate portion of a said program; and said Content node data structure operable upon a tree traversal to place a test value in said test case, said test value derived from a defined range of values and determined based upon prescribed probability values, said probability values determining the probability that said test value, when calculated by said processor means, is within said defined range, above said defined range or below said defined range.

14. A data processing system for enabling a user to generate test cases for exercising and testing a program under test, said data processing system comprising:

a display;

input means;

memory for storing a library of nodes including AND, OR, Decision and Content nodes and for further storing graphical user-interface procedures for enabling a user to display, create and change said nodes; and processor means coupled to said display, input means and memory and responsive to user inputs to create in said memory a data base defining a tree structure that includes a plurality of said nodes, each node comprising a node data structure, each said Content node data structure enabling entry of data into said test case, and operative upon a tree traversal to place a test value in said test case, said test value derived from a defined range of values and determined based upon prescribed probability values, said proabability values determining the probability that said test value, when calculated by said processor means, is within said defined range, above said defined range or below said defined range.

15. A data processing system for enabling a user to generate test cases for exercising and testing a program under test, said data processing system comprising:

a display;

input means;

memory for storing a library of nodes including AND, OR, Decision and Content nodes and for further storing graphical user-interface procedures for enabling a user to display, create and change said nodes; and processor means coupled to said display, input means and memory and responsive to user inputs to create in said memory a data base defining a tree structure that includes a plurality of said nodes, each node comprising a node data structure, each said OR node data structure connected by plural links to a plurality of child node data structures and upon a tree traversal, is operable to place in one said test case, information contained in one child node data structure, each link including an associated probability value, said processor means randomly selecting one said link to a child node data structure from among said plural links, said selecting occurring in accordance with said link's associated probability value.

16. The data processing system as recited in claim 15 wherein each said OR node data structure includes loop variable data that is interpreted by said processor means to control a number of times said OR node data structure and depending child nodes are traversed during an execution of said test case.

17. The data processing system as recited in claim 16 wherein said loop variable data comprises a range of loop values, said range defined by high and low loop values, and further comprising associated probability values which determine a probability that a number of loops calculated by said processor means will lie within said range, be less than said range or be greater than said range.

18. The data processing system as recited in claim 17 wherein said OR node data structure further comprises expected result data that are dependent upon a said calculated number of loops, whereby during execution, said expected result data is used to confirm operability of at least an intermediate portion of said program.

* * * * *